United States Patent Office — 3,751,412, Patented Aug. 7, 1973

3,751,412
2-AMINO-1,5-BENZODIAZOCINE DERIVATIVES

Hideaki Natsugari, Osaka, and Kanji Meguro and Yutaka Kuwada, Hyogo, Japan, assignors to Takeda Chemical Industries, Ltd., Higashi-ku, Osaka, Japan
No drawing. Filed Sept. 2, 1971, Ser. No. 177,511
Claims priority, application Japan, Sept. 3, 1970, 45/77,313
Int. Cl. C07d 53/00
U.S. Cl. 260—239 BD    8 Claims

ABSTRACT OF THE DISCLOSURE

Compounds of the formula

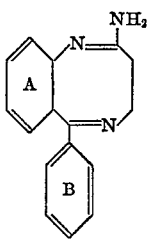

wherein rings A and B are unsubstituted or have one or more of the same or different substituents selected from the group of halogen, nitro, trifluoromethyl, lower alkyl and lower alkoxy and pharmaceutically acceptable salts thereof have diuretic activity and low acute toxicity.

---

This invention relates to novel and useful 2-amino-1,5-benzodiazocine derivatives of the general formula

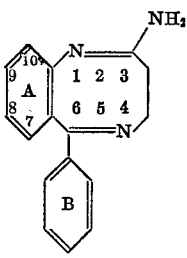

wherein rings A and B are unsubstituted or have one or more of the same or different substituent(s) selected from the group consisting of halogen (e.g. fluorine, chlorine, bromine, iodine), nitro, trifluoromethyl, alkyl of 1 to 4 carbon atoms (e.g., methyl, ethyl, propyl, isopropyl, butyl) and alkoxy of 1 to 4 carbon atoms (e.g., methoxy, ethoxy, propoxy, isopropoxy, butoxy), their pharmaceutically acceptable salts, and to a method for production thereof. A 2-amino-1,5-benzodiazocine derivative (I) can be produced by the following process:

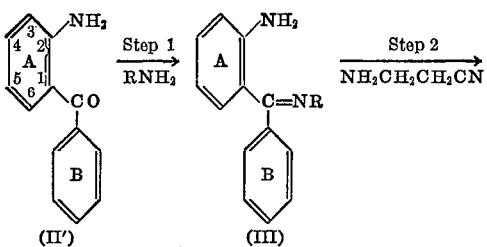

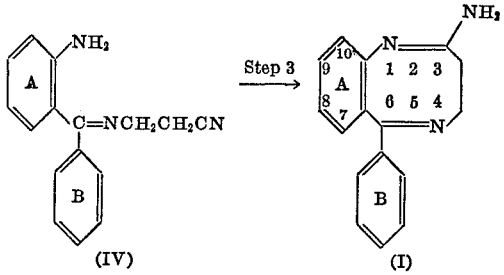

wherein both rings A and B have the same meaning as hereinbefore defined, R is hydrogen, alkyl, straight, branched or cyclic, of 1 to 7 carbon atoms (e.g., methyl, ethyl, propyl, isopropyl, butyl, cyclopentyl, cyclohexyl), hydroxyalkyl (e.g., hydroxyethyl, hydroxypropyl), or aralkyl (e.g., benzyl, phenethyl).

It is considered to be very difficult to produce a 2-amino-α-phenylbenzylideneaminopropionitrile derivative by the direct reaction of a 2-aminobenzophenone derivative with β-aminopropionitrile, and there has been no report on the synthesis of such a compound. We conducted a study of possible methods for the synthesis of a compound of Formula IV and ultimately discovered that whereas, by the direct reaction, it was difficult to obtain a compound of Formula IV in commercially acceptable yield, the same compound IV was produced under comparatively mild conditions in a short period of time and in a high yield by reacting a 2-aminobenzophenone (II) with ammonia or a suitable primary amine (II') to obtain a ketimine derivative (III), followed by reacting this derivative (III) with β-aminopropionitrile.

STEP 1

A 2-aminobenzophenone derivative (II) is first reacted with ammonia or a primary amine (II)' to produce a Compound III.

Generally, the reaction is conducted under heating in the presence or absence of a solvent. The heating temperature is generally about 100° to about 180° C., preferably about 120° to about 140° C. The amount of an amine (II)' is generally not lower than one mole and preferably about 5 to about 10 moles per mole of the Compound II. The Compound II and/or the amine (II)' may be used in the form of their acid salts (e.g., hydrochloride, sulfate). It is recommended that the reaction be carried out in the presence of a catalyst, 2-methylimidazole or its mineral acid salts (e.g., hydrochloride, sulfate). The amount of the catalyst is generally not lower than one mole and preferably about one to about 5 moles per mole of the Compound II.

STEP 2

The ketimine derivative (III) obtained above is reacted with β-aminopropionitrile to produce a 2-amino-α-phenylbenzylideneaminopropionitrile (IV).

Generally, this reaction is carried out in an anhydrous polar solvent (e.g., methanol, ethanol, pyridine, dimethylformamide, acetonitrile), and proceeds advantageously in the presence of an acid catalyst. As regards the acid catalyst, one mole equivalent of an acid is generally added to each mole of β-aminopropionitrile. The acid is an inorganic acid (e.g., hydrochloriic acid, sulfuric acid) or an organic acid (e.g., acetic acid, propionic acid, p-toluenesulfonic acid). There may be a case in which β-aminopropionitrile is added in the form of its acid salt (e.g., hydrochloride, sulfate, hydrogen sulfate). In this case, the reaction may proceed advantageously in the presence of an acid acceptor (e.g., triethylamine, pyridine, N-alkylpiperidine, 2-methylimidazole, imidazole). While the reaction is usually carried out around the boiling point of the solvent used, it may be conducted at a suitable temperature either above or below the boiling point.

After the reaction, the resulting α-phenylbenzylideneaminopropionitrile derivative (IV) can be recovered in any desired purity by separation and purification techniques which are conventional per se. For instance, the compound can be isolated and purified by removing the solvent by distillation from the reaction mixture, extracting the residue with a suitable solvent, recrystallizing the residue.

Generally, each of the products in Step 1 (Compound III) and in Step 2 (Compound IV) is a mixture of two geometrical isomers (i.e., syn- and anti-isomer), and one of the isomers or each isomer can be separated from the mixture, if desired, by recrystallization or chromatography. Since each of the isomers can be equally used as the starting materials in the next steps, the mixtures prepared in each step are preferably used as such without further purification procedures.

STEP 3

The Compound IV is cyclized to obtain a compound of Formula I. This cyclization reaction proceeds advantageously in the presence of an anhydrous acid catalyst. As regards the said acid catalyst any type of catalyst with which the object of the invention may be successfully accomplished. Thus, mineral acids such as hydrogen chloride and, sulfuric acid, and organic acids such as acetic acid and trifluoroacetic acid may be mentioned by way of example.

The reaction is usually conducted in a solvent and in the presence of said acid catalyst. As regards the solvent, methanol, ethanol and the like are usually employed.

However, when acetic acid is used as said acid catalyst, for instance, the reaction may be carried out utilizing the acid itself as the solvent.

While the reaction is usually carried out at a suitable temperature between about 0° C. and about 30° C., it is possible to conduct the reaction at a temperature above or below the aforementioned range.

It should also be understood that, by controlling the reaction conditions suitably, it is possible to carry out the reactions of Step 2 and of Step 3 at one operation.

The 2-aminobenzocine derivative (I) which is produced in the foregoing manner can be recovered in any desired purity from the reaction mixture by separation and purification procedure, which are conventional per se, for example, by removing the solvent by distillation, neutralizing the reaction mixture, extracting the residue with a suitable solvent, removing the solvent from the extract and, if required, recrystallizing the residue.

Since the objective Compound I of this invention has basic nitrogen atoms in its molecule, it is capable of forming salts with suitable acids. The acids which form salts with the Compound I may be inorganic acids or organic acids. The inorganic acids include hydrochloric acid, sulfuric acid, phosphoric acid and the like, while the organic acids include acetic acid, propionic acid, oxalic acid, fumaric acid and the like. The salts with above exemplified acids are all non-toxic and pharmaceutically acceptable.

The conversion of a Compound I to its acid salt can be effected by a conventional technique.

In this invention, a starting 2-aminobenzophenone derivative (II) is easily prepared by well known methods.

The 2-aminobenzodiazocine derivative (I) as well as the acid addition salts produced according to this invention are novel compounds which exhibit an immediate diuretic effect in rats with low acute toxicity.

By way of illustration, the diuretic effect and acute toxicity ($LD_{50}$) are shown below of 2-amino-8-chloro-3,4-dihydro-6-phenyl-1,5-benzodiazocine.

Acute toxicity: Mice, $LD_{50}$ 500 mg./kg.
Diuretic effect:* Rats, dose 30 mg./kg.

| Time after administration | Quantity of urine | Quantity excreted | | |
|---|---|---|---|---|
| | | $Na^+$ | $Cl^-$ | $K^+$ |
| 5 hours | 1.9 times | 1.7 times | 1.7 times | 18. times |

*The test animals were orally administered with physiological saline solution previously, and the results are shown in comparison with control (no addition of the test compound).

Therefore, the Compound I can be used as diuretics, especially diuretics for the patients who suffer from the edema caused by heart failure or liver cirrhosis.

In addition, certain compounds of Formula I (e.g. 2-amino-8-chloro-3,4-dihydro-6-phenyl-1,5-benzodiazocine, 2-amino-3,4-dihydro-6-phenyl-1,5-benzodiazocine, 2-amino-3,4-dihydro-8-methyl-6-phenyl-1,5-benzodiazocine) show a conspicuous anti-barium activity which is analogous to that of papaverine and, as such, can be used as anticonvulsants and peripheral circulation stimulants.

Possessing those varied properties, the objective compounds of this invention are of use as medicines. In addition, those compounds or salts may, if required, be admixed with pharmaceutically acceptable inert carriers or vehicles and, as such, used orally or topically in suitable pharmaceutical forms such as powders, granules and injections. While the proper dosage is dependent upon the type of a compound, symptoms and other factors, the dosage for adults by oral route is generally about 20 mg. to 200 mg. per day.

An example of practical recipes in which the compounds of this invention are utilized as remedies for diuresis as follows:

| Tablet or capsule: | Mg. |
|---|---|
| 2-amino-8-chloro-3,4-dihydro-6-phenyl-1,5-benzodiazocine | 20 |
| Lactose | 80 |
| Corn starch | 29 |
| Magnesium stearate | 1 |
| | 130 |

The objective compounds of this invention can also be used as intermediates for the synthesis of derivatives which are of use as medicines.

The invention will be further illustrated by the following examples, wherein the relation between "part(s) by weight" and "part(s) by volume" corresponds to the relation between "gram(s)" and "milliliter(s)".

EXAMPLE 1

(Step 1–A).—A mixture of 2-amino-5-chlorobenzophenone (30 parts by weight), cyclohexylamine (150 parts by volume) and 2-methylimidazole hydrochloride (60 parts by weight) is heated at 130° to 140° C. for 9 hours. After cooling, water (300 parts by volume) is added and the resulting crystals are collected by filtration, whereupon 2-amino-5-chloro-α-phenylbenzylideneaminocyclohexane is obtained in almost quantitative yield. Recrystallizable from aqueous ethanol yields colorless flakes melting at 136°–138° C.

(Step 1–B).—A mixture of 2-amino-5-chlorobenzophenone (2.3 parts by weight), ethanolamine (6.1 parts by volume) and 2-methylimidazole hydrochloride (1.2 part by weight) is heated at 125°–130° C. for 2 hours. After cooling, water (200 parts by volume) is added and the resulting precipitate is collected by filtration, whereupon 2-amino-5-chloro-α-phenylbenzylideneaminoethanol is obtained as pale yellow crystals. Recrystallization from benzene-n-hexane gives pale-yellow crystals melting at 125°–126° C.

According to a similar procedure to those described in the above example, the following compounds are prepared from the corresponding 2-aminobenzophenone derivatives.

2 - amino - 5 -chloro - α - phenylbenzylideneaminopropanol; yellow crystals (from n-hexane), M.P. 102°–105° C.

2 - amino - 5 - chloro - α - phenylbenzylideneaminobutane; yellow oil.

2 - amino - 5 - nitro - α - phenylbenzylideneaminocyclohexane; yellow needles (from methanol), M.P. 158°–159.5° C.

2 - amino - 5 - nitro - α - phenylbenzylideneaminoethanol; yellow needles (from benzene), M.P. 151°–152° C.

2 - amino - α - phenylbenzylideneaminoethanol; colorless crystals, M.P. 110° C. (This compound is a mixture of syn- and anti-isomer and, by fractional recrystallizations from benzene-n-hexane, can be divided into two isomers, one colorless needles melting at 118°–119° C., and the other colorless flakes melting at 116.5° C.).

2 - amino - 5 - methyl - α - phenylbenzylideneaminoethanol; colorless prisms (from n-hexane), M.P. 72°–73° C.

2 -amino - 5 - trifluoromethyl - α - phenylbenzylideneaminoethanol; yellowish red oil.

2 - amino - 5 - chloro - α - (4-chlorophenyl)benzylideneaminoethanol; colorless prisms (from benzene), M.P. 124°–125° C.

2 - amino - 5 - chloro - α - (4 - methoxyphenyl)benzylideneaminoethanol; pale yellow prisms (from methanol), M.P. 139°–140° C.

EXAMPLE 2

(Step 2–A).—To a solution of 2-amino-5-chloro-α-phenylbenzylideneaminocyclohexane (0.3 part by weight) in methanol (10 parts by volume) are added β-aminopropionitrile (0.21 part by volume) and acetic acid (0.18 part by volume). The mixture is refluxed for 1.5 hours and the solvent is distilled off under reduced pressure. To the residue is added water and the mixture is extracted with methylenechloride. The methylenechloride layer is washed with water and dried over sodium sulfate. Removal of the solvent and treatment of the residue with diethyl ether give 2-amino-5-chloro-α-phenylbenzylideneaminopropionitrile as crystals. Recrystallization from benzene-n-hexane affords colorless flakes melting at 137°–138° C.

(Step 2–B).—To a solution of 2-amino-5-chloro-α-phenylbenzylideneaminoethanol (27.4 parts by weight) in methanol (500 parts by volume) are added β-aminopropionitrile (21 parts by weight) and acetic acid (18 parts by volume), and the mixture is refluxed for 1 hour. After evaporation of the solvent under reduced pressure, the residue is extracted with chloroform. The chloroform layer is washed with water and then dried over sodium sulfate. Removal of the solvent and treatment of the residue with n-hexane give 2-amino-5-chloro-α-phenylbenzylideneaminopropionitrile as crystals. Recrystallization from benzene-n-hexane yields colorless flakes melting at 135° C. This compound coincides in all respects with the product obtained in Example 2 (Step 2–A).

According to a similar procedure to those described in the above Example 2, the following compounds are prepared from the corresponding ketimine derivatives prepared in Example 1.

2 - amino - 5 - nitro - α - phenylbenzylideneaminopropionitrile; yellow prisms (from benzene), M.P. 154°–155° C. (sinter), 172° C.

2 - amino - α - phenylbenzylideneaminopropionitrile; pale yellow needles (from benzene-n-hexane), M.P. 96°–98° C. (sinter), 105° C.

2 - amino - 5 - methyl - α - phenylbenzylideneaminopropionitrile, colorless prisms (from benzene-n-hexane), M.P. 111°–113° C.

2 - amino - 5 - trifluoromethyl - α - phenylbenzylideneaminopropionitrile; colorless prisms (from ether-n-hexane), M.P. 125°–127° C.

2 - amino - 5 - chloro - α - (4 - chlorophenyl)benzylideneamino-propionitrile; colorless prisms (from benzene-n-hexane), M.P. 134°–135° C.

2 - amino - 5 - chloro - α - (4 - methoxyphenyl)benzylideneaminopropionitrile; by fractional recrystallizations from benzene-n-hexane, can be divided into syn- and anti-isomers, one colorless prisms, M.P. 149°–150° C., and the other colorless needles, M.P. 99°–101° C.

EXAMPLE 3

(Step 3).—A solution of 2-amino-5-chloro-α-phenylbenzylideneaminopropionitrile (1.4 part by weight) in methanol (25 parts by volume) is saturated with dry hydrogen chloride gas under ice-cooling and kept standing for another about 15 minutes. The reaction mixture is concentrated under reduced pressure at about 40° C. The concentrate is poured into a saturated sodium bicarbonate solution and extracted with chloroform. The chloroform layer is washed with water and dried over sodium sulfate. The solvent is distilled off, whereupon 2-amino-8-chloro-3,4-dihydro-6-phenyl-1,5-benzodiazocine is obtained as colorless crystals. Recrystallization from benzene yields colorless needles melting at 218°–220° C. (decomposition).

Elementary analysis $C_{15}H_{14}ClN_3$: Calcd. (percent): C, 67.72; H, 4.97; N, 14.81. Found (percent): C, 67.52; H, 4.92; N, 15.19.

According to a similar procedure to those described in the above Example 3, the following compounds are prepared from corresponding 2-amino-α-phenylbenzylideneaminopropionitrile prepared in Example 2.

2-amino-3,4-dihydro-8-nitro-6-phenyl - 1,5 - benzo-diazocine, pale yellow needles (from benzene-chloroform), M.P. 242°–244° C.

2-amino-3,4 - dihydro - 6-phenyl-1,5-benzodiazocine, colorless needles (from benzene), M.P. 186°–187° C.

2-amino-3,4 - dihydro - 8 - methyl-6-phenyl-1,5-benzodiazocine, colorless needles (from dichloromethane-n-hexane), M.P. 185°–186° C.

2-amino-3,4 - dihydro - 6-phenyl-8-trifluoromethyl-1,5-benzodiazocine, colorless needles (from benzene), M.P. 213°–214° C.

2-amino-8-chloro - 6 - (4-chlorophenyl)-3,4-dihydro-1,5-benzodiazocine, colorless needles (from benzene), M.P. 181°–183° C.

2-amino-8-chloro - 3,4 - dihydro-6-(4-methoxyphenyl)-1,5-benzodiazocine, colorless prisms (from methanol), M.P. 254–255° C.

What we claim is:
1. A member selected from the group consisting of a compound of the formula

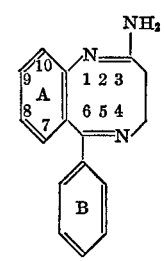

wherein rings A and B are unsubstituted or have one or more of the same or different substituent(s) selected from the group consisting of halogen, nitro, trifluoromethyl, lower alkyl and lower alkoxy and pharmaceutically acceptable salts thereof.

2. A compound according to claim 1, namely, 2-amino-8-chloro-3,4-dihydro-6-phenyl-1,5-benzodiazocine.

3. A compound according to claim 1, namely, 2-amino-3,4-dihydro-8-nitro-6-phenyl-1,5-benzodiazocine.

4. A compound according to claim 1, namely, 2-amino-3,4-dihydro-6-phenyl-1,5-benzodiazocine.

5. A compound according to claim 1, namely, 2-amino-3,4-dihydro-8-methyl-6-phenyl-1,5-benzodiazocine.

6. A compound according to claim 1, namely, 2-amino-3,4-dihydro - 6-phenyl - 8 - trifluoromethyl-1,5-benzodiazocine.

7. A compound according to claim 1, namely, 2-amino-8-chloro-6-(4-chlorophenyl)-3,4-dihydro - 1,5 - benzodiazocine.

8. A compound according to claim 1, namely, 2-amino-8-chloro-3,4-dihydro-6-(4-methoxyphenyl) - 1,5 - benzodiazocine.

References Cited
UNITED STATES PATENTS

| | | | |
|---|---|---|---|
| 3,577,557 | 5/1971 | Ott | 260—239.3 B |
| 3,341,592 | 9/1967 | Sternbach et al. | 260—239 BD |
| 3,422,091 | 1/1969 | Archer et al. | 260—239 BD |

OTHER REFERENCES

Derieg et al.: J. Org. Chem., vol. 34, pp. 179–183 (1969).

Denzer et al.: J. Org. Chem., vol. 34, pp. 183–187 (1969).

Steinman et al.: J. Pharm. Sci., vol. 58, pp. 830–832 (1969).

Derieg et al.: Chem. Abstracts, vol. 72, Abstract No. 31,862Y (1970).

ALTON D. ROLLINS, Primary Examiner

U.S. Cl. X.R.

260—465 E, 566 R; 424—244